(12) United States Patent
Folkes et al.

(10) Patent No.: US 7,292,535 B2
(45) Date of Patent: Nov. 6, 2007

(54) HIGHLY-AVAILABLE OSPF ROUTING PROTOCOL

(75) Inventors: Ronald P. Folkes, Dallas, TX (US); Lance A. Visser, Dallas, TX (US); Thomas L. Watson, Richardson, TX (US)

(73) Assignee: Chiaro Networks Ltd, Tel Aviv (IL)

( * ) Notice: Subject to any disclaimer, the term of this patent is extended or adjusted under 35 U.S.C. 154(b) by 1094 days.

(21) Appl. No.: 10/153,500

(22) Filed: May 23, 2002

(65) Prior Publication Data

US 2003/0218982 A1 Nov. 27, 2003

(51) Int. Cl.
*H04L 1/00* (2006.01)
(52) U.S. Cl. ............................... 370/238; 714/4
(58) Field of Classification Search ............... None
See application file for complete search history.

(56) References Cited

U.S. PATENT DOCUMENTS

| | | | |
|---|---|---|---|
| 5,473,599 A | 12/1995 | Li et al. | |
| 5,920,566 A * | 7/1999 | Hendel et al. | 370/401 |
| 6,418,139 B1 * | 7/2002 | Akhtar | 370/356 |
| 6,944,675 B2 * | 9/2005 | Fujita | 709/240 |
| 6,950,427 B1 * | 9/2005 | Zinin | 370/386 |
| 6,983,294 B2 * | 1/2006 | Jones et al. | 707/202 |
| 6,985,959 B1 * | 1/2006 | Lee | 709/238 |
| 7,006,441 B1 * | 2/2006 | Choudhury et al. | 370/236 |
| 7,065,059 B1 * | 6/2006 | Zinin | 370/312 |

| | | | |
|---|---|---|---|
| 2002/0024934 A1 | 2/2002 | Claude et al. | |
| 2003/0056138 A1 * | 3/2003 | Ren | 714/4 |
| 2003/0137974 A1 * | 7/2003 | Kwan et al. | 370/352 |

FOREIGN PATENT DOCUMENTS

EP 0 858 189 A 8/1998

OTHER PUBLICATIONS

U.S. Appl. No. 09/703,057, Brewer.
U.S. Appl. No. 09/852,223, Watson.
Doyle, Jeff. "Routing TCP/IP," (1998) pp. 409-584, vol. 1, Macmillan Technical Press, Indianapolis, USA.
European Search Report, EP 03 25 2645, Aug. 21, 2003.

* cited by examiner

*Primary Examiner*—Huy D. Vu
*Assistant Examiner*—Robert W. Wilson
(74) *Attorney, Agent, or Firm*—Harold Novick; Stanley N. Protigal; The Nath Law Group

(57) ABSTRACT

In highly-available Open Shortest Path First (OSPF) routing in a network, the dynamic state of a backup OSPF instance in a router is synchronized with the dynamic state of an active OSPF instance using explicit message transmission from the active instance to the backup instance. After this, the dynamic state synchronization of the backup OSPF instance is maintained using a combination of explicit message updates from the active OSPF instance together with a message flow-through mechanism. In the event of fail-over of the active OSPF instance, then the router recovers seamlessly without reconfiguring or interrupting traffic among peer routers in the network, by functionally substituting the synchronized backup OSPF instance for the active OSPF instance, such that the backup OSPF instance establishes itself as the new active OSPF instance.

25 Claims, 4 Drawing Sheets

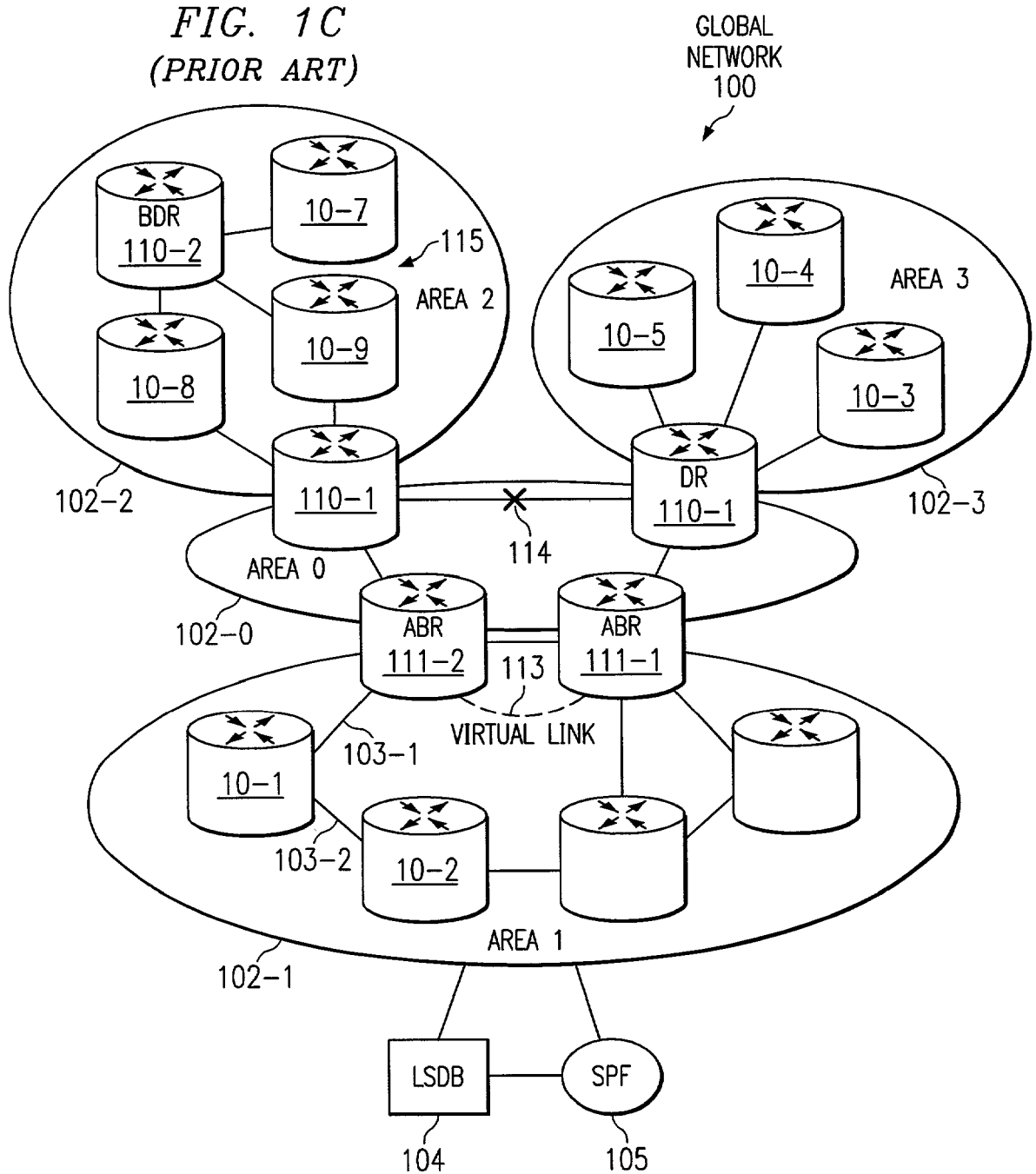

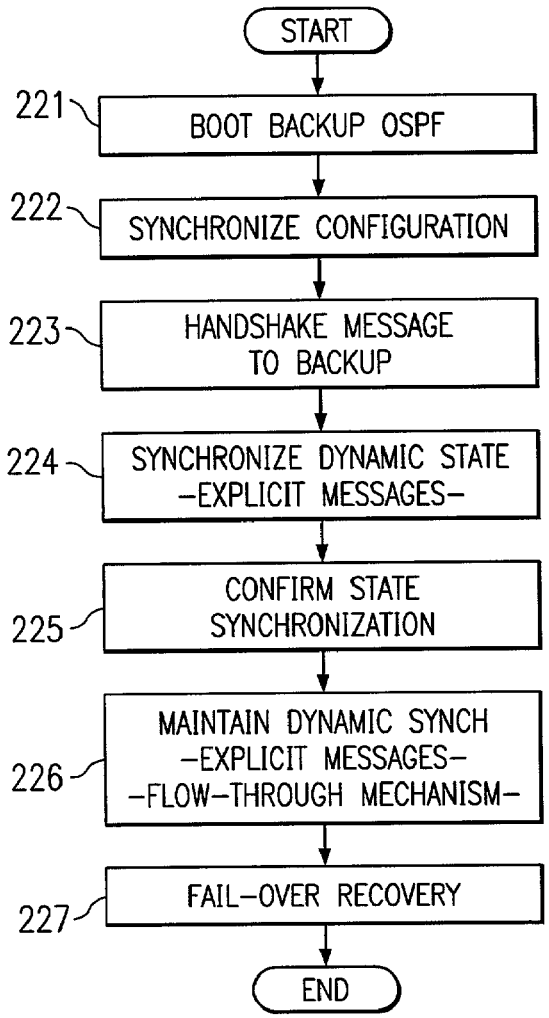
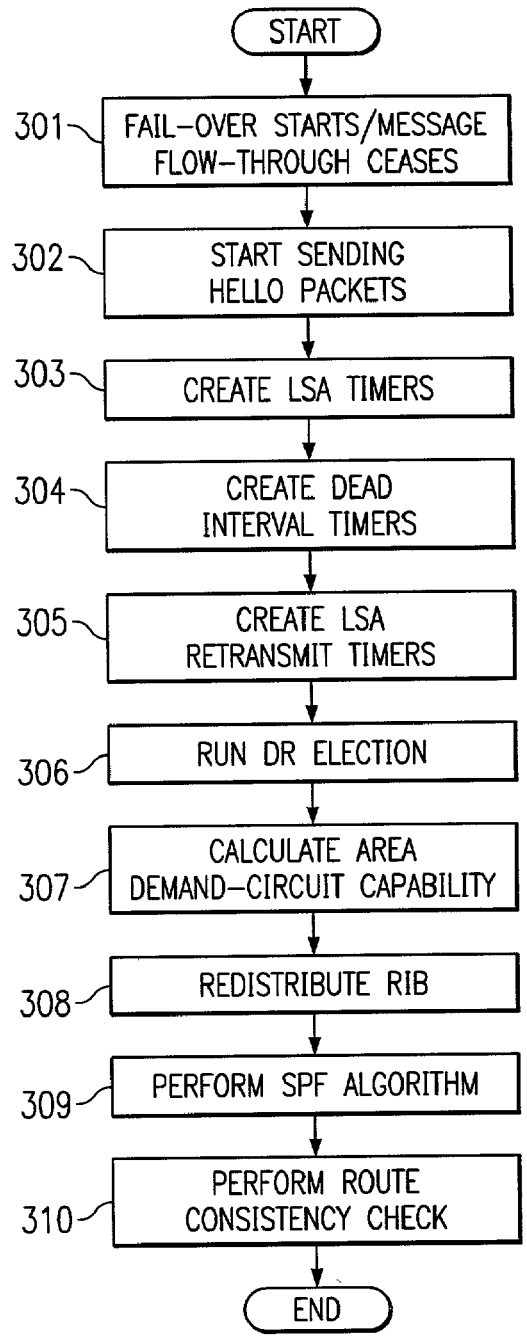

HIGHLY-AVAILABLE OSPF ROUTING PROTOCOL

CROSS-REFERENCE TO RELATED APPLICATIONS

The present application is related to co-pending and commonly assigned U.S. application Ser. No. 09/703,057, entitled "SYSTEM AND METHOD FOR IP ROUTER WITH AN OPTICAL CORE," filed Oct. 31, 2000; and to co-pending and commonly assigned U.S. application Ser. No. 09/852,223, entitled "SYSTEM AND METHOD FOR TCP CONNECTION PROTECTION SWITCHING," filed May 9, 2001; the disclosures of which are hereby incorporated herein by reference.

TECHNICAL FIELD

The invention relates to network routers, and more particularly to highly available OSPF protocol network routers.

BACKGROUND OF THE INVENTION

FIG. 1A is a simplified block diagram schematically representing a typical prior art network router 10. Packet forwarding router 10 includes two major subsystems: control plane 12 and data plane 11. Data plane 11 provides the packet forwarding function in interfaces 14 for store-and-forward transit packets. This subsystem relies on a packet forwarding "look-up" table that is created and maintained by control plane 12. The forwarding table instructs data plane 11 where to forward each received packet. Control plane 12 creates the packet forwarding table using information from various sources, including static configuration and dynamic information learned from peer network routers through connections 15-1 through 15-N and interfaces 14, and communicates the forwarding tables to interfaces 14. In prior art systems, command line interface (CLI) 13 is a text-based system associated with control plane 12 for applying configuration changes to a router's operational state.

Open shortest path first (OSPF) is a dynamic routing protocol that is part of the router's control plane (see for example Doyle, "Routing TCP/IP," Vol. I, MacMillan 1998, pp. 409-584, hereby incorporated herein by reference). It communicates with other OSPF instances running on other routers in a network to learn about remote destinations it can reach. OSPF contributes this information to the packet forwarding table used by the data plane.

OSPF is a link-state dynamic routing protocol, essentially containing three layers, as illustrated in FIG. 1B. The first layer is Hello protocol layer 180. OSPF periodically transmits Hello packets to each attached network. The function of a Hello packet is to discover new OSPF neighbor routers and to maintain relationships (called "adjacencies") with existing OSPF neighbor routers. The second layer is Reliable Flooding layer 185. Each OSPF router originates messages called link-state advertisements (LSAs) that describe its network interfaces and adjacencies with other OSPF routers. The collection of all LSAs in the network is called the link-state database (LSDB). The OSPF Reliable Flooding protocol operates over the neighbor adjacencies to ensure that the link-state database is synchronized on all routers (i.e., that each router has all LSAs originated by all other routers). The third layer is Shortest Path First (SPF) layer 190 based on the Dijkstra SPF algorithm (see Doyle 1998, cited above). The SPF algorithm uses the LSDB as input to calculate packet forwarding table information. In general, OSPF executes the SPF algorithm whenever a change in the LSBD occurs.

FIG. 1C schematically illustrates the logical structure of a conventional OSPF global network 100, each logical entity of which has its own set of attributes. An OSPF area, for example areas 102-0, . . . , 102-N, is a logical grouping of OSPF routers 10-1, . . . , 10-N. Each area 102-0, . . . , 102-N is described by its own link state database, for example LSDB 104. Area border routers (ABRs) 111-1, 111-2 are routers that each belong to at least two areas 102-1, . . . , 102-N, connecting to area 102-0 (backbone area), and maintaining a separate LSDB, including running the SPF algorithm, for each such connected area. Neighbor routers 10-2, . . . , 10-N are linked to respective areas 102-0, . . . , 102-N through interfaces 103-1, . . . , 103-N. The OSPF routers on each multi-access (M-A) network segment 115, for example an Ethernet or ATM configuration, elect a Designated Router (DR) 110-1, which maintains links with all routers internal to its M-A segment. Each such M-A segment also selects a Backup Designated Router (BDR) 110-2, which becomes the new DR in case of failure of the existing DR. The other routers within a M-A segment maintain direct links only with DR 110-1 and BDR 110-2 internal to the M-A segment to which they belong and not with any other router in that M-A segment. DR 110-1 also manages the Reliable Flooding process on behalf of all routers in its M-A segment. This reduces the proliferation of copies of the same LSA on the same network that would otherwise occur and cause network traffic congestion. There can be more than one M-A segment 115 in a particular OSPF area. Virtual link 113 is an information "tunnel" not restricted to any particular physical link, through which OSPF protocol packets can be routed on the optimal path from one router to another. In case a link failure, for example at location 114, creates a partitioned area with isolated OSPF routers, a virtual link reconnects the OSPF routers in the partitioned area to the network backbone.

In the prior art, typically if an OSPF router fails, a separate standby peer router having its separate control plane and data plane is booted and then takes over from scratch, reconfigures itself, and re-establishes all of its interfaces with the network. The resulting network topology change affects other OSPF routers in the network, and leads to LSDB changes, new SPF calculations to create new forwarding tables, and possibly temporarily unreachable network destinations. It would therefore be advantageous in the art to develop a system and method for seamless failover of an OSPF, such that a standby entity takes over from a failed active entity without needing to replace, reinitialize, or reconfigure the failed router or its network connections.

BRIEF SUMMARY OF THE INVENTION

The present invention is directed to a system and method of highly-available Open Shortest Path First (OSPF) routing in a network. The dynamic state of a backup OSPF instance in a router is synchronized with the dynamic state of an active OSPF instance using explicit message transmission from the active instance to the backup instance in the router control plane. After this the dynamic state synchronization of the backup OSPF instance is maintained using a combination of explicit message updates from the active OSPF instance together with a message flow-through mechanism. The active OSPF maintains forwarding tables in a shared central data plane that routes transit traffic through a shared central switch fabric. In the event of failure of the active OSPF instance, then the router recovers seamlessly without reconfiguring or interrupting traffic among peer routers in the network, by functionally substituting the synchronized backup OSPF instance for the active OSPF instance, such that the backup OSPF instance establishes itself as the new active OSPF instance. During this recovery process, the shared central switch fabric in the shared central data plane continues to forward transit traffic in accordance with route instructions implemented through forwarding tables created and maintained by the control plane.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIGS. 1A-1C illustrate schematically various prior art aspects of OSPF protocol architecture;

FIG. 2B is a flow diagram depicting achieving and maintaining of state synchronization between the active and backup OSPF instances in the HA OSPF architecture; and FIG. 3 is a flow diagram depicting in more detail the processing by the backup OSPF instance to establish itself as the new active OSPF instance when a fail-over recovery occurs, in accordance with HA OSPF embodiments.

DETAILED DESCRIPTION OF THE INVENTION

Figure 1A:
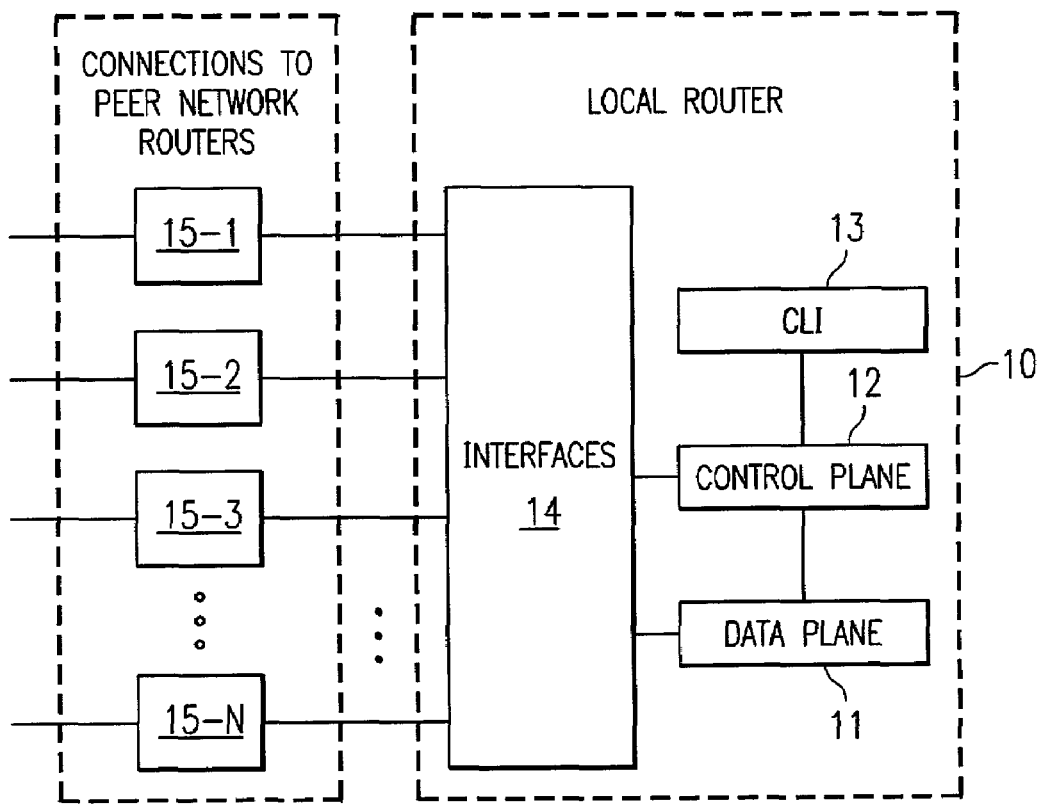
Figure 1B:
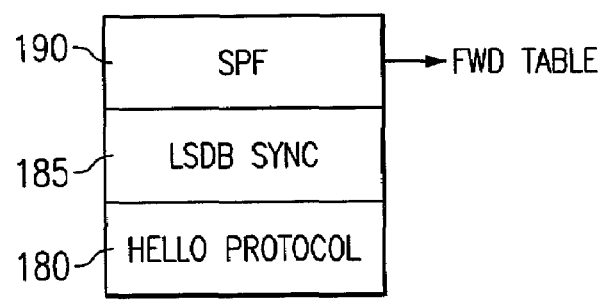

This invention is directed to a novel architecture for high-availability (HA) OSPF dynamic routing protocol. The purpose of HA OSPF is to provide fail-over protection in the event of failure or shutdown of the hardware platform supporting the routing protocol control plane. Fail-over protection means that the OSPF function of the control plane continues to operate and maintains all dynamic state information. OSPF instances on other routers in the network do not detect the fail-over condition on the local router. The HA OSPF architecture is based on commodity hardware components and is completely compatible with existing OSPF standards and available implementations. The architecture uses two separate hardware platforms that each execute the control plane software. The two systems are assigned roles of "active" and "backup." The active and backup protocol processors are connected to each other by a special purpose network.

Dynamic routing protocols are protocols that routers use to communicate with each other, to decide where the traffic goes on the Internet. In "Highly available (HA) routing protocols", routing fails over completely seamlessly. The outside world is unaware that there has been a fault from one router to another. The backup software and the backup router take over seamlessly, such that no one in the outside world knows that there has been a problem. During this recovery process, a central switch fabric in the central data plane of the router continues to forward transit traffic in accordance with routing instructions in forwarding tables created and maintained by the control plane.

A number of different architectures build on each other to get to this eventual goal of 'high availability.'

The first set of architectures relate to a number of concepts, one of which is TCP socket fail-over (see U.S. application Ser. No. 09/852,223, cited above, the disclosure of which has been incorporated herein by reference). TCP protocol was not designed so that one computer could quickly take over from another in the event of a TCP failure, but was designed so that one computer could talk to another in a one-to-one relationship. Border Gateway Protocol (BGP) uses TCP sockets to communicate with other routers. Consequently, the groundwork to make BGP highly available needed a reliable TCP connection that could be taken over seamlessly by another computer without interruption.

Related to a highly available TCP socket is another architecture that relies on flow-through. For TCP fail-over to work, flow-through works on a level below TCP at an Internet Protocol (IP) level, providing highly available service at that level, so that connections from one router to another that use IP protocol, such as OSPF, are protected. Flow-through and TCP recovery architecture and methodology are the foundations on which the higher level service oriented protocol architecture and methodology are based. Users want protection of the services, rather than just the parameters that underlie the services.

For protection at the OSPF system level and the BGP level, the starting point after the communication mechanisms between routers are protected is to make sure that these can be recovered during switch-over from an active protocol processor to a backup protocol processor, to protect the actual software running on a high level, for example, OSPF or BGP, such that all the state information and detailed operations that are running BGP or OSPF are successfully and seamlessly transported to the backup system, thus allowing the backup system to take over. A number of algorithms and procedures are executed to accomplish that seamless fail-over.

At a high conceptual level, highly available (HA) embodiments of TCP, BGP, and OSPF protocol fail-over recovery have three main characteristics in common. The first characteristic is bringing a backup protocol instance into initial synchronization with an active state. There is a mechanism in all three cases to synchronize the state of the active protocol instance, for example OSPF, into the backup instance. The second characteristic is, once initial synchronization is achieved, to make sure that the backup instance stays in sufficient synchronization with the active protocol instance. Whatever state changes occur on the active that are critical for the HA approach, have to be reflected at the appropriate time to the backup. The third major characteristic is that if the active fails, the backup has to be able to assume the active role. It has to perform whatever recovery processing is required and phase in the processing that the active was doing in a manner such that a third party or a peer router does not detect the switch-over, or at least such that the network is not impacted adversely by the switch-over.

The main differences among the three protocols in the high availability approach are driven by the fact that the protocols themselves are different. They all involve sending and receiving packets on a network, but the different state machines are defined and implemented in each protocol. The formats of the packets and the sequences in which the packets are sent, the semantics and the meanings of the packets are different for the different protocols.

OSPF exists in an environment of other software, including an operating system which provides services that OSPF relies on, for example fail-over detection and message flow-through. Specifically the operating system is responsible for synchronizing the active network interface configuration with the backup. When the backup boots, the operating system on the active is responsible for making sure that certain interfaces exist on the backup. Once that is done, routing software is responsible for synchronizing the static command line configuration from the active dynamic routing protocol (DRP) to the backup DRP. That includes, for example, setting addresses on the interfaces and certain other attributes, which are basically configuration items that are manually entered at the command line.

Figure 2A:
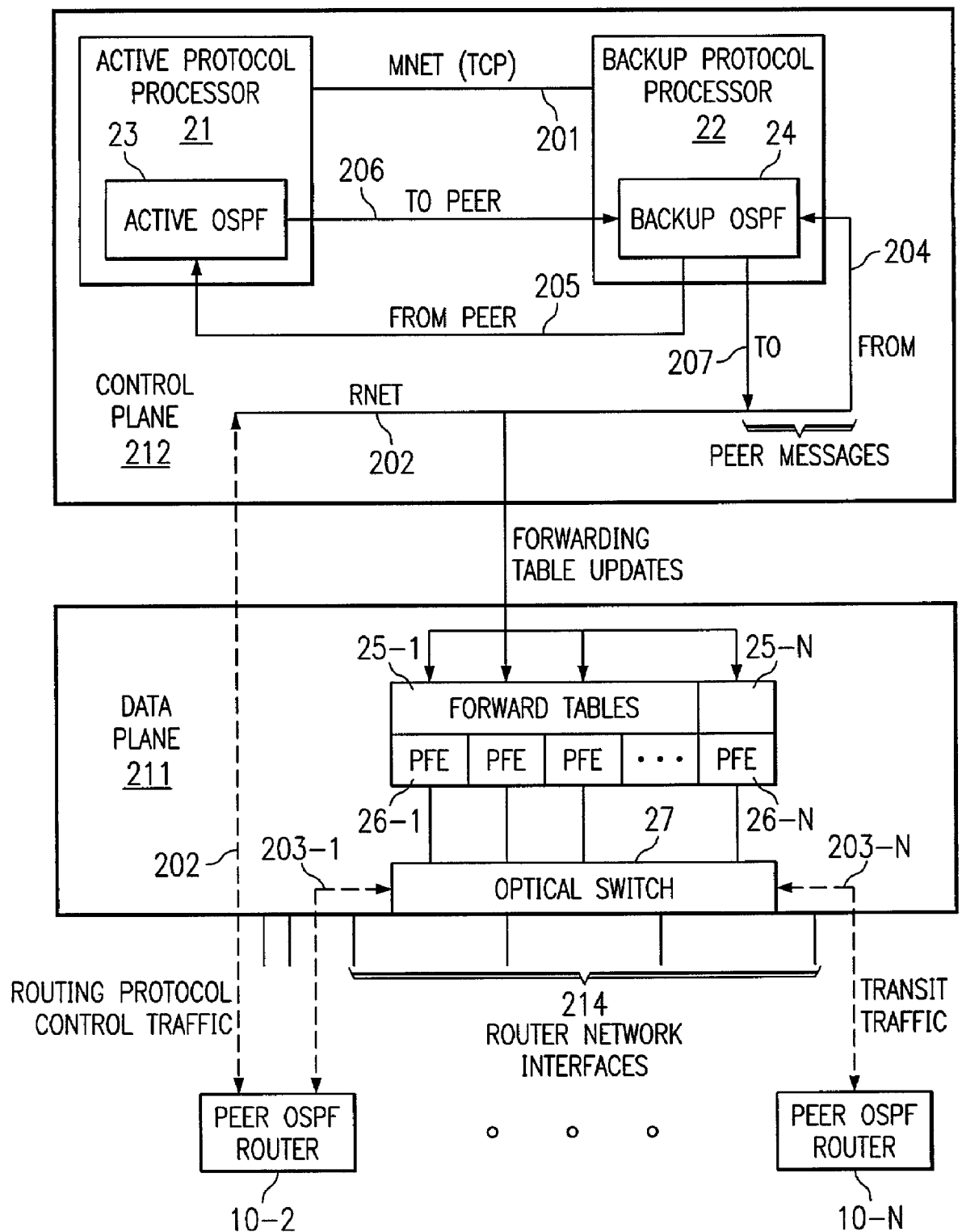
FIG. 2A schematically illustrates router subsystems of the HA OSPF architecture, in accordance with embodiments of the present invention.

FIG. 2A schematically illustrates router subsystems 20 of the HA OSPF architecture. Control plane 212 includes active protocol processor 21 running active OSPF software instance 23 and backup protocol processor 22 running backup OSPF software instance 24. Active and backup OSPF protocol instances are directly linked together through reliable TCP MNET 201. Routing protocol control traffic to and from peer OSPF routers 10-2, . . . , 10-N is distributed within control plane 212 through routing network (RNET) 202. HA OSPF features a flow-through architecture, such that all incoming protocol control traffic flows first via RNET 202 over link 204 through backup instance 24 before flowing from backup instance 24 over link 205 to active instance 22. Similarly, all protocol control traffic originating at active instance 22 flows first over link 206 through backup instance 24 before flowing from backup instance 24 over link 207 into RNET 202. From RNET 202 the protocol control traffic is distributed to peer OSPF routers 10-2, . . . , 10-N.

Active OSPF instance 22 alone executes the SPF algorithm using input protocol control information to initialize and update forwarding tables 25-1, . . . , 25-N in shared central data plane 211. Transit traffic to and from peer OSPF routers 10-2, . . . , 10-N travels through data links 203-1, . . . , 203-N and is routed by shared central multipole optical switch fabric 27 within shared central data plane 211 in accordance with forwarding tables 25-1, . . . , 25-N through respective associated packet forwarding engines (PFEs) 26-1, . . . , 26-N. Control and transit traffic to and from other peer OSPF routers (not shown) flows through router network interfaces 214.

In the event that active protocol processor 21 fails or must be shut down to perform maintenance, backup protocol processor 22 assumes the functions required for control plane 212. Data plane 211 continues to forward transit packets using forwarding tables 25-1, . . . , 25-N and is unaware of the processor switch-over in control plane 212. Thus, the function of backup protocol processor 22 is to maintain sufficient static and dynamic state, so that it can assume the role of active protocol processor 21 at any time.

Detecting the failure of the active protocol processor is performed by the operating system.

In the HA architecture, OSPF on backup protocol processor 22 maintains state information corresponding to the OSPF state of active protocol processor 21 with regard to neighbor relationships/adjacencies and link state database. As such, OSPF on the backup protocol processor is a passive consumer of information originated by active OSPF instance 23 and other OSPF routers in the network. Backup OSPF instance 24 does not send any protocol packets nor does it execute the SPF algorithm. It does not create any LSAs and does not execute any timer-driven functions. In the event of a fail-over, backup OSPF instance 24 executes recovery functions, such that it begins sending the same Hello packets as former active OSPF instance 23, assumes the LSA flooding functions of the former active instance, and executes the SPF algorithm to update forwarding tables 25-1, . . . , 25-N.

FIG. 2B is a flow diagram depicting the achieving and maintaining of state synchronization between active OSPF instance 23 and backup OSPF instance 24 in the HA OSPF architecture. HA architecture OSPF uses various mechanisms to achieve and maintain state synchronization between active OSPF instance 23 and backup OSPF instance 24. When the backup instance boots up at step 221, the dynamic state of the active OSPF is mirrored to the backup, driven by the active OSPF. After configuration synchronization at step 222 is complete, then OSPF synchronization can start from the active instance to the backup.

First, at step 223 active OSPF instance 23 sends a handshake message to backup OSPF instance 24 to verify that the backup OSPF instance exists. Once it receives a response from the backup to the handshake message, at step 224 active OSPF instance 23 sends explicit messages to backup OSPF instance 24 describing its current dynamic state including global state information, network interface state information, neighbor router state information, and link-state database (LSDB) state information, for example:

Global ASBR status;

Global Router-ID;

State of each configured OSPF area;

Within each area, the state of each configured interface (This includes the interface state, DR, BDR);

Within each interface, the state of each known neighbor (This includes the neighbor router ID and IP address, neighbor priority and neighbor state);

All AS-external routes contained in the active OSPF; and

Within each area, the area-specific LSAs contained in the active OSPF.

The synchronization interface contains the global status for the active OSPF protocol, which includes the Autonomous System Boundary Router (ASBR) status (see for example Doyle, 1998, pp. 409-584, cited above and incorporated herein by reference) of the current router, and the global router ID. After synchronizing the global information from the active OSPF to the backup, the active OSPF synchronizes the information related to each OSPF area configured to attach to the current router. Within each area, active OSPF describes or synchronizes the information related to each network interface in that area, because each network interface belongs only to one area. Then for each network interface the active OSPF describes the neighbors that are attached to that network interface. Also the link state database is synchronized explicitly from the active OSPF to the backup. Each OSPF area has its own link state database containing the set of link state advertisements (LSAs) specific to that area, and there is a global external link state database containing external LSAs that are global to the entire network OSPF instance and do not belong to any one area.

The initial state synchronization in step 224 uses the reliable Transmission Control Protocol (TCP) connection, conventional in the art, between the two OSPF instances 23, 24 over private protocol processor network MNET 201.

At step 225 the active OSPF instance confirms when the backup OSPF is synchronized. One way to do this is to confirm that all global, area, interface, neighbor state and LSAs exist on the backup OSPF. To confirm that the backup has the same LSA database as the active, the backup instance can send a LSA checksum sum for each area to the active instance. If all of the area's LSA checksums are equal, then it is reasonably certain that all of the LSA databases are the same. Note that during this check, it would be important for both the active and the backup OSPF instances to suspend processing of LSA update packets.

To maintain dynamic synchronization requires maintaining basically the same types of information, for example synchronization for global state, for anything that changes in the area, interface state, neighbor state, link state, and database state. Dynamic synchronization is done using a combination of explicit messages from the active to the backup and flow-through messages that the backup receives, that were sent from either peer routers or the active OSPF instance.

At step 226, HA OSPF relies in part on a message flow-through mechanism (see U.S. application Ser. No. 09/852,223, cited above, the disclosure of which has been incorporated herein by reference), to maintain dynamic state synchronization between the active and backup OSPF instances, which guarantees that backup OSPF instance 24 reads every OSPF protocol packet sent from local active OSPF protocol instance 23, as illustrated in FIG. 2A. Message flow-through also guarantees that backup OSPF instance 24 reads every OSPF protocol packet that is received by local active protocol processor 21 from other OSPF routers 10-2, . . . , 10-N in the network. Using the message flow-through mechanism, backup OSPF instance 24 can perform any processing required on the received messages to ensure that it maintains dynamic state synchronization with active OSPF instance 23. This includes maintaining finite state machines for neighbors and keeping the link-state database updated.

To maintain dynamic state synchronization between active and backup OSPF instances at step 226, HA OSPF embodiments use in part explicit updates from the active OSPF instance to the backup instance, which are specific to the operation of the OSPF protocol. They are separate from any other part of the system and from other protocols, e.g., BGP. There are basically four types of information to update explicitly from the active to the backup.

First, if the active OSPF instance originates, updates, or refreshes a LSA that is not flooded, then the active explicitly sends a message to the backup to tell the backup of the changes. The main reason to send an explicit message rather than relying on flow-through is that if no neighbors exist in the area, then the LSA is not flooded, and the backup OSPF instance cannot read it on the flow-through path, and therefore a message must be sent explicitly.

Second, according to the same reasoning, if the active instance deletes a LSA, it sends a message to peer routers to tell them that the deleted LSA is no longer valid, but if there is no neighbor, then the message to report the deletion is not sent, and therefore the backup could never read the deletion on the flow-through path, so it is sent explicitly.

Third, interface state updates are likewise explicitly sent over from the active instance to the backup. For example, an interface state transition occurs when an interface is initially enabled in OSPF on an Ethernet network segment, and that interface is in a state called 'Wait.' The active OSPF sets a timer, generally 40 seconds, after which it transitions the interface into a different state. Since the backup OSPF does not execute any timer processing, and thus cannot have that same timer to effect the state transition, the active OSPF has to tell the backup explicitly when that transition occurs.

Fourth, designated router (DR) elections are performed only on the active OSPF instance, which then has to tell the backup explicitly of the election results.

In the event of a fail-over at step 227, message flow-through ceases, such that the backup protocol processor communicates directly with other routers in the network. In HA OSPF architecture, the backup OSPF instance establishes itself as the active OSPF instance by enabling periodic timer processing to perform OSPF maintenance functions, for example, transmitting Hello packets and refreshing self-originated LSAs. During recovery, OSPF also executes the SPF algorithm on its existing link-state database. The forwarding table calculated from the SPF algorithm is then sent to shared central data plane 211 to be used in forwarding transit traffic. The assumption is that the backup OSPF instance has been able to maintain sufficient state synchronization with the active, so that when the fail-over occurs, the backup already has the data available in its memory to perform this processing.

FIG. 3 is a flow diagram depicting in more detail the processing by the backup to establish itself as the active OSPF instance when a fail-over recovery occurs, in accordance with HA OSPF embodiments.

At step 301, fail-over starts and message flow-through ceases. At step 302, backup OSPF instance 24 starts sending Hello packets to all known neighbors, including neighbors on virtual links, so that they will not time out and declare the local router down.

At step 303, backup OSPF instance 24 creates refresh timers for all self-originated LSAs that were created by active instance 23. In OSPF a LSA is refreshed, i.e., retransmitted, to neighbor routers with a new sequence number every 30 minutes, and that refresh is caused by the expiration of the timer. Since the backup OSPF does not initially have any timers, when it becomes the active it has to create those timers and schedule the LSAs to be refreshed as previously.

At step 304, backup OSPF instance 24 creates dead interval timers for all known neighbors. If a Hello packet from any neighbor is not received after a default period of typically 40 seconds, the neighbor is declared down, and whatever destinations were previously associated with it cannot be reached. Again, backup OSPF instance 24 has to create those dead interval timer instances when it becomes the active instance.

The OSPF protocol defines a retransmit mechanism by which, if a LSA is sent to a neighbor, then an explicit acknowledgement is expected from that neighbor. There may be a LSA that the prior active OSPF instance 23 was in the process of sending or flooding, but that had not been acknowledged from a neighbor. At step 305, backup (newly established active) OSPF instance 24 creates retransmit timers for the LSAs. The newly established active instance 24 in that case retransmits the LSA to that neighbor until an acknowledgement is received, and therefore must create the timer instance to cause that retransmission to occur.

At step 306, newly established active OSPF instance 24 runs the DR election algorithm for each multi-access OSPF network segment. The DR election algorithm is conventionally scheduled to occur in the future on active instance 23, and the backup does not know whether or not the active had planned or had scheduled to execute that algorithm before the fail-over occurred. Consequently, to cover the case in which a DR election had been scheduled, the default is to proceed to run the DR election on newly established active OSPF instance 24. Generally the election results would be the same as for the existing state, so the effect would essentially be nothing.

At step 307, new active OSPF instance 24 performs an evaluation of each area's demand-circuit capability, which is an area attribute that tells whether or not there are any routers that do not support demand-circuit LSAs.

At step 308 is a redistribution from the routing information base (RIB). OSPF can import router protocol information from other protocols, such as BGP, on the same router, which does not occur on the backup instance.

At step 309, new active OSPF instance 24 performs a complete SPF algorithm calculation. Similar to the reason for step 306, the active instance conventionally schedules an SPF calculation to occur at some point in the future, and the backup instance does not know whether or not the active had scheduled it to occur. Therefore, when the backup establishes itself as new active OSPF instance 24, it runs the SPF calculation by default. Another reason for this is that the backup OSPF does not run the SPF calculation while in backup mode, and consequently has not added any route information to the forwarding table. It executes the SPF algorithm, which results in taking the input from the link state database and generating the routing table entries that are eventually sent to the packet forwarding engines 26-1, . . . , 26-N (PFEs).

At step 310, after all of the protocols have completed their recovery, a consistency check for the redistributed routes is performed. The redistributed routes cause LSA creation at step 308, and a consistency check between the current step 308 LSAs and the previous LSAs maintained during synchronization with the active OSPF instance before fail-over insures that they are correct.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of a highly-available Open Shortest Path First (OSFP) routing network, comprising the steps of:

using an active OSPF instance in an active processor and a backup OSPF instance in a backup processor synchronizing the dynamic state of the backup OSPF instance with the dynamic state of the active OSPF instance using explicit message transmission from said active instance to said backup instance;

maintaining dynamic state synchronization of said backup OSPF instance with said active OSPF instance using a combination of explicit message update from said active OSPF instance to said backup OSPF instance together with a message flow-through mechanism comprising reading by said backup OSPF instance every one of a plurality of OSPF protocol packets before said every one of the plurality of OSPF protocol packets being read by the active instance;

OSPF protocol packet being read by said active OSPF instance sent to a router;

in the event of fail-over of said active OSPF instance, seamlessly recovering form said fail-over without reconfiguring or interrupting the traffic among peer router in said network, by functionally substituting the state synchronized backup OSPF instance for said active OSPF instance, and establishing said backup OSPF instance as a new active OSPF instance.

2. The method of claim 1 wherein said explicit message transmission is performed through a highly reliable private protocol processor link.

3. The method of claim 2 wherein said highly reliable private protocol processor link is a highly reliable Transmission Control Protocol (TCP) link.

4. The method of claim 1 wherein said step of synchronizing comprises transmitting a handshake message from said active OSPF instance and receiving at said active OSPF instance a message from said backup OSPF instance in response to said handshake message.

5. The method of claim 1 wherein said step of synchronizing comprises synchronization of global state information.

6. The method of claim 1 wherein said step of synchronizing comprises configuration synchronization of each OSPF area.

7. The method of claim 6 wherein said step of synchronizing comprises synchronization of the state of each configured OSPF interface.

8. The method of claim 7 wherein said step of synchronizing comprises synchronization of the state of each known neighbor.

9. The method of claim 6 wherein said step of synchronizing comprises synchronization of area-specific link state advertisements (LSAs).

10. The method of claim 1 wherein said step of synchronizing comprises confirmation that said backup OSPF instance is synchronized with said active OSPF instance.

11. The method of claim 10 wherein said confirmation is achieved by receiving at said active OSPF instance link state advertisement (LSA) checksums from said backup OSPF instance.

12. The method of claim 1 wherein said step of maintaining using said explicit message updates comprises interface state updates, designated router election results, and link-state advertisement (LSA) and deleted LSA results.

13. The method of claim 1 wherein said step of maintaining using said message flow-through mechanism comprises reading by said backup OSPF instance of every OSPF protocol packet sent from and/or received by an active OSPF protocol processor.

14. The method of claim 1 wherein, to establish the new active OSPF instance in the event of fail-over of said active OSPF instance, said backup OSPF begins sending Hello packets to all known neighbors, based on synchronized state information.

15. The method of claim 1 wherein, to establish the new active OSPF instance in the event of fail-over of said active OSPF instance, said backup OSPF creates refresh timers for all self-originated LSAs that were created by said active instance.

16. The method of claim 1 wherein, to establish the new active OSPF instance in the event of fail-over of said active OSPF instance, said backup OSPF creates dead intervaltimers for all known neighbors.

17. The method of claim 1 wherein, to establish the new active OSPF instance in the event of fail-over of said active OSPF instance, said backup OSPF creates retransmit timers for LSAs.

18. The method of claim 1 wherein, to establish the new active OSPF instance in the event of fail-over of said active OSPF instance, said backup OSPF runs a designated router (DR) election algorithm for each multi-access OSPF network segment.

19. The method of claim 1 wherein, to establish the new active OSPF instance in the event of fail-over of said active OSPF instance, said backup OSPF performs an evaluation of each area's demand-circuit capability.

20. The method of claim 1 wherein, to establish the new active OSPF instance in the event of fail-over of said active OSPF instance, said backup OSPF redistributes routing information (RIB).

21. The method of claim 1 wherein, to establish the new active OSPF instance in the event of fail-over of said active OSPF instance, said backup OSPF performs a complete Shortest Path First (SPF) algorithm calculation.

22. The method of claim 1 wherein, to establish the new active OSPF instance in the event of fail-over of said active OSPF instance, said backup OSPF performs a consistency check for redistributed routes.

23. A system for highly-available Open Shortest Path First (OSPF) routing in a network, comprising a local OSPF router and peer network router, said local router including:

A control plane containing an active processor running an active OSPF instance and a backup processor running a backup OSPF instance directly connected with said active OSPF instance through a highly reliable private processor link;

A data plane containing packet forwarding engines using routing table initialized and updated from said control plane, said data plane operable to distribute protocol and transmit traffic among said peer network routers; and A message flow-through architecture, such that all incoming protocol control traffic from said peer network router flow first through said backup OSPF instance of the backup processor before flowing to the active OSPF instance of the active processor and such that all protocol control traffic originating at said active OSPF instance flows first through said backup OSPF instance before being distributed among said peer network router.

24. The system of claim 23 wherein said highly reliable private processor link is a highly reliable Transmission Control Protocol (TCP) link.

25. The method of claim 1, further comprising reading by said backup OSPF instance of every one of the plurality of OSPF protocol packet; transmitting said plurality of OSPF protocol packets by said backup OSPF instance to said active OSPF instance, and reading by said active OSPF instance of the plurality of OSPF protocol packets.

* * * * *